United States Patent [19]

Kammoto et al.

[11] Patent Number: 4,647,961
[45] Date of Patent: Mar. 3, 1987

[54] APPARATUS FOR READING THE IMAGE INFORMATION OF A COLORED ORIGINAL

[75] Inventors: Yoshiaki Kammoto, Tokyo; Takahiro Asai, Yokohama; Taira Kouchiwa, Kamakura; Masanori Saitoh, Komae; Shunji Asano, Funabashi, all of Japan

[73] Assignee: Ricoh Company Ltd., Tokyo, Japan

[21] Appl. No.: 757,792

[22] Filed: Jul. 22, 1985

[30] Foreign Application Priority Data

Jul. 23, 1984 [JP] Japan ................................ 59-151306
Feb. 8, 1985 [JP] Japan ........................... 60-015919[U]

[51] Int. Cl.$^4$ ............................................. H04N 1/46
[52] U.S. Cl. ...................................... 358/75; 358/29; 358/163
[58] Field of Search ........................... 358/29, 75, 163

[56] References Cited

U.S. PATENT DOCUMENTS

| | | | |
|---|---|---|---|
| 4,136,360 | 1/1979 | Hoffrichter et al. | 358/80 |
| 4,358,794 | 11/1982 | Kurakami et al. | 358/293 |
| 4,368,482 | 1/1983 | Machida et al. | 358/29 |
| 4,454,532 | 6/1984 | Itani et al. | 358/29 |
| 4,523,229 | 6/1985 | Kanmoto | 358/163 |
| 4,524,388 | 6/1985 | Abe et al. | 358/163 |
| 4,554,583 | 11/1985 | Saitoh et al. | 358/163 |

FOREIGN PATENT DOCUMENTS

| | | | |
|---|---|---|---|
| 79567 | 6/1980 | Japan | 358/163 |
| 58370 | 5/1981 | Japan | 358/75 |
| 91777 | 5/1984 | Japan | 358/163 |

*Primary Examiner*—Ronald C. Capossela
*Attorney, Agent, or Firm*—Cooper, Dunham, Griffin & Moran

[57] ABSTRACT

An apparatus for reading an image information of a colored original including an original supporting member, an optical system and a reading device for reading out the image information separated in at least two colors and for converting the optical information into the electric output. A standard reflection member for white balance is arranged within an illuminating range of the original supporting member and outside of an effective range for reading out of the original. Output levels of electric circuits for each separated colors are compensated dependent on electric outputs of the reading device regarding to the image information for separated colors of the light reflected from the standard reflection member.

11 Claims, 11 Drawing Figures

APPARATUS FOR READING THE IMAGE INFORMATION OF A COLORED ORIGINAL

BACKGROUND OF THE INVENTION

This invention relates to an Apparatus for reading the image information of the colored original in an image processing installation such as a copying machine, a printer, a facsimile machine and so on.

Apparatus is known for reading the image information of a colored original with an original supporting member, an optical system having a lamp for exposing the original placed on the original supporting member and a lens for forming an image of the original by the reflected ray from the original and a reading device for reading out information of the image separated in at least two colours and for converting the optical information into electrical output.

In such apparatus the exposing light for the original is separated in at least two colors, for example three colors such as red, green and blue and the information of the separated colors is converted to electrical signals at the reading device such as CCD etc.

The white background of the copy can be used as a measure of the quality of color reproduction. The information of the light separated in three colors is converted in electrical information in each separated colour by the reading devices such as CCD. And the outputs of each CCD in accordance with a white standard are controlled in equivalent value for improving the reappearance of the colour. In such manner a white balance controlling is carried out. A spectro-distribution characteristic at the time when the white balance is controlled can not be always maintained, so that the white balance can be changed dependent on a change of the spectro-distribution characteristic of a light source.

SUMMARY OF THE INVENTION

It is an object of this invention that the above-mentioned problem is solved and the white balance can be maintained always independent on the change of light source condition.

The aforesaid object is accomplished according to the invention by providing a standard reflection member for white balance at place within an illuminating range and outside of an effective range for reading out of the original and by compensating the output level of the electric circuit for each separated color depending on the electric output of each separated color information of the light reflected from the standard reflection member for white balance.

According to the invention, the Apparatus for reading the image information of the colored original is constructed as described hereinabove, and the white balance can be maintained always by the automatic control even in the case of an original having little white background such as a colored photo, because the outputs of the separated color information can be controlled to proper values based on the light reflected from the standard reflection member.

As the white balance is maintained always, an image signal can be obtained for good reappearance of the color independent on the change of the luminous energy of the light source.

In one embodiment the standard reflection member is placed at a position deviated from the image forming plane and a large quantity of reflected luminous energy can be obtained, so that an averaged standard signal can be obtained, because the image is out of focus.

It is advantageous that the standard reflection member be kept free from taint by covering it.

DESCRIPTION OF THE PREFERRED EMBODIMENT

The invention will now be described in detail by referring to the accompanying drawings showing the preferred embodiments thereof.

Figure 1:
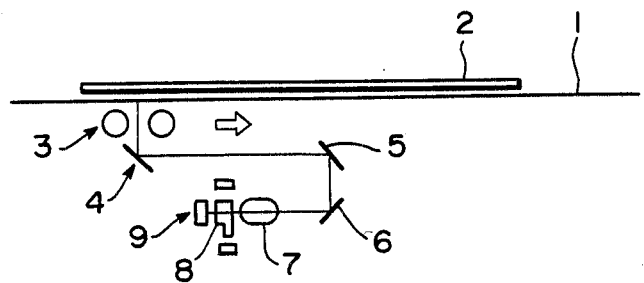
FIG. 1 is a schematic view of the optical system of the Apparatus for reading the image information of the colored original of this invention.

Referring to FIG. 1, 1 designates a document or an original supporting element such as a contact glass member, 2 designates an original, 3 designates a light source such as a flourescent lamp etc., and 4, 5 and 6 designate mirrors. In this embodiment the original is stationary and an optical system is reciprocated for scanning the original.

When the light source 3 and the mirror 4 are moved with velocity V for scanning the original, the mirrors 5 and 6 are moved in a direction shown by an arrow with velocity V/2. The original 2 is illuminated by the light source 3 and the light reflected from the original is projected to a lens 7 through the mirrors 4, 5 and 6. The light projected through the lens is separated in colors by a spectro means or color separating means 8 such as a dichroic prism. The image of the separated color light, for example red light, green light and blue light are formed on a read out element 9 having for example a read out element 9a for red such as CCD R, a read out element 9b for green such as CCD G, and a read out element 9c for blue such as CCD B. A reading device is constructed by a colour separating means 8 and a read out element 9.

Figure 2:
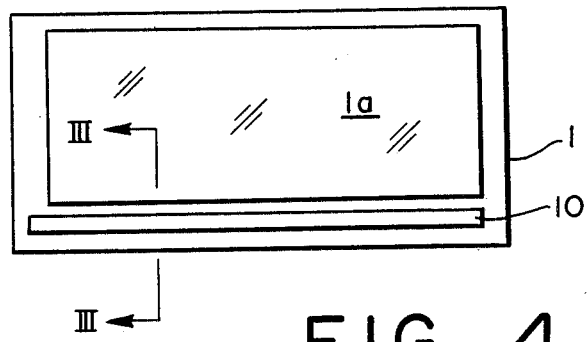
FIG. 2 is a plan view of the original supporting member.
Figures 3, 4:
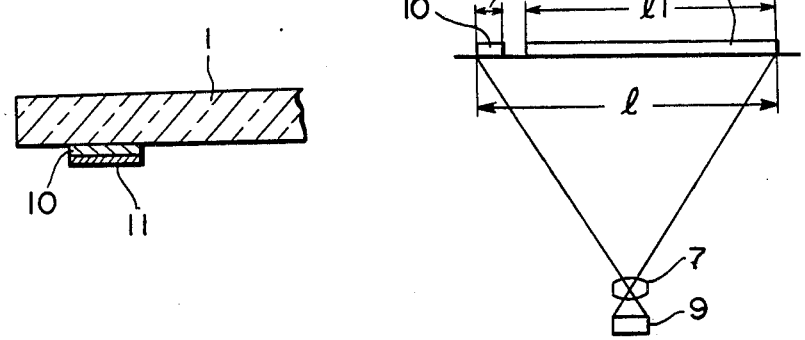
FIG. 3 is a magnified sectional view taken along the line III—III in FIG. 2.
FIG. 4 is a developed side view of FIG. 1.

Referring to FIGS. 2 and 3 a standard reflection plate for the white balance 10 is provided on an upper surface or an under surface of the original supporting element 1. A place on which the standard reflection plate 10 is provided is limited within an illuminating range, for example from 1st bit to 2048th bit, and outside of the effective reading out range for the original, for example from 200th bit to 2000th bit. In one example the place for providing the standard reflection plate 10 is in a range from 100th bit to 110th bit. In FIG. 3 the standard reflection plate 10 is placed on the under side of the original supporting element 1 namely on the surface opposite to the original placing surface. The standard reflection plate 10 is made of white paper fixed to the original supporting element or made by adhering of magnesium oxide or barium salphate on the original supporting element. The standard reflection plate has a standard color of white background. A surface of the standard reflection plate 10 opposite the light source 3 is covered by a transparent protection film 11 and the protection film prevents the standard reflection plate 10 from being soiled.

Referring to FIG. 4 the effective reading out range for the original $l_1$ and the standard reflection plate 10 placed outside of the effective reading out range for the original are illuminated simultaneously by the light source 3 in each sub scanning, and the image of the original is formed on CCD 9 by using the lens 7. The image information read out by CCD 9 is taken out sequentially in main scanning from the standard reflection plate 10 to a termination end of the effective reading out range for the original $l_1$ from CCD 9 as electric signal. In FIG. 4 l designates an illuminating range for example from 1st bit to 2048th bit, and $l_2$ designates a standard reflection range of the standard reflection plate 10 for example from 10th bit to 100th bit. The effective reading out range for the original $l_1$ can be selected in the range including for example from 200th bit to 2000th bit.

In another embodiment the whole surface including the original 2 and the standard reflection plate 10 is illuminated by the light source 3 and the reading device including the read out means 9 and color separating means 8 is moved in the main scanning direction and the sub scanning direction.

Figure 5:
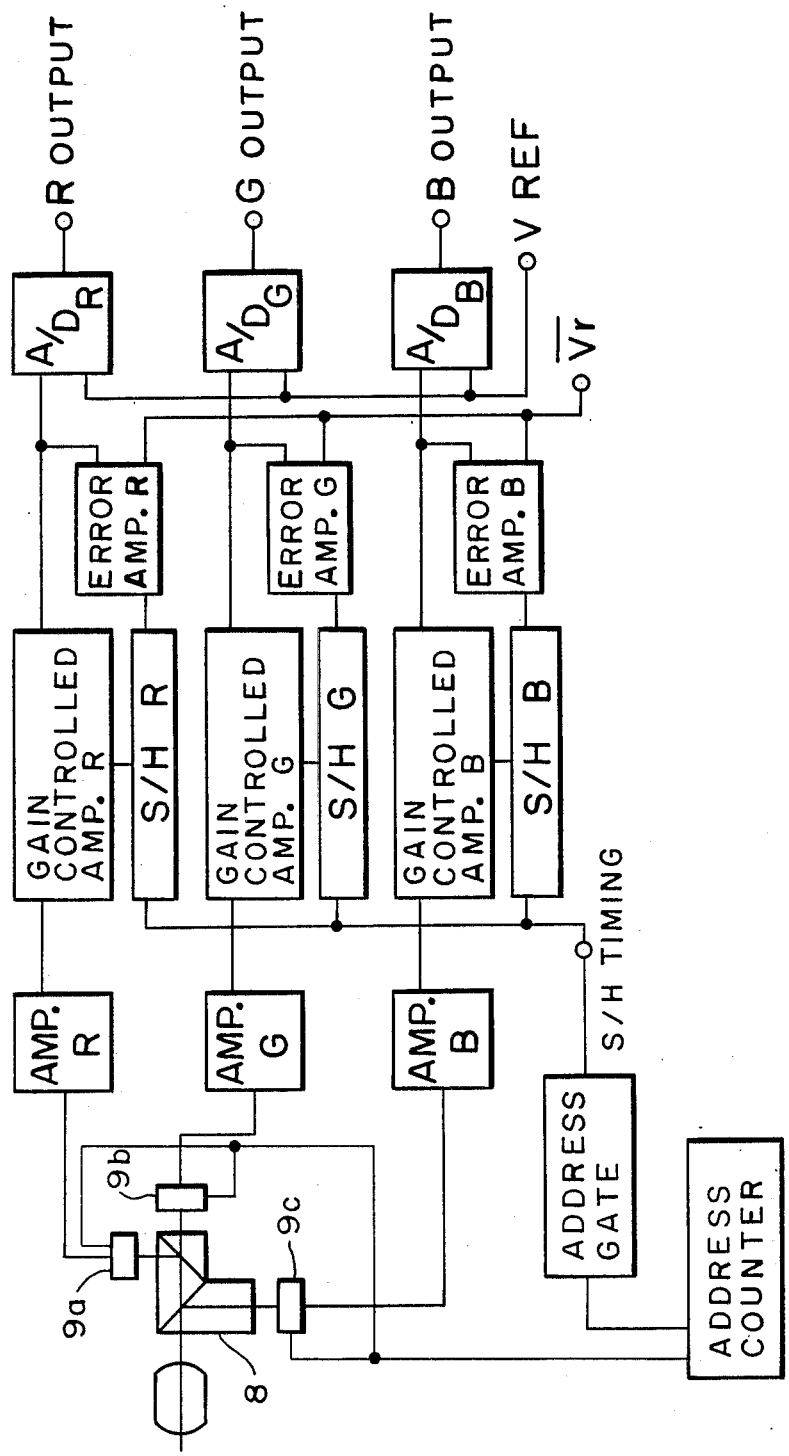
FIG. 5 is a electric circuit of one example.

Referring to FIG. 5 the electrical signal converted from the optical signal for red in CCD R 9a is amplified in a amplifier R and inputted in a gain controlled amplifier R. The electrical signal converted from the optical signal for green in CCD G 9b is amplified in a amplifier G and inputted in a gain controlled amplifier G. The electrical signal converted from the optical signal for blue in CCD B 9c is amplified in a amplifier B and inputted in a gain controlled amplifier B.

A timing signal is fed from an adress counter to CCD synchronous with the movement of a scanning device for the optical system as an address signal of the illuminating range 1. The electrical signal converted from the optical signal at an address corresponding to the address of the address signal is fed from CCD to the amplifier. At the same time the address signal is fed from the address counter to an address gate. In the address gate a pulse signal showing a Sample and Hold (S/H timing) corresponding to a predetermined address range, for example from the 10th bit to the 110th bit, is produced and fed to the gain controlled amplifier, in order to hold an output of the gain controlled amplifier at a S/H timing.

Figure 6:
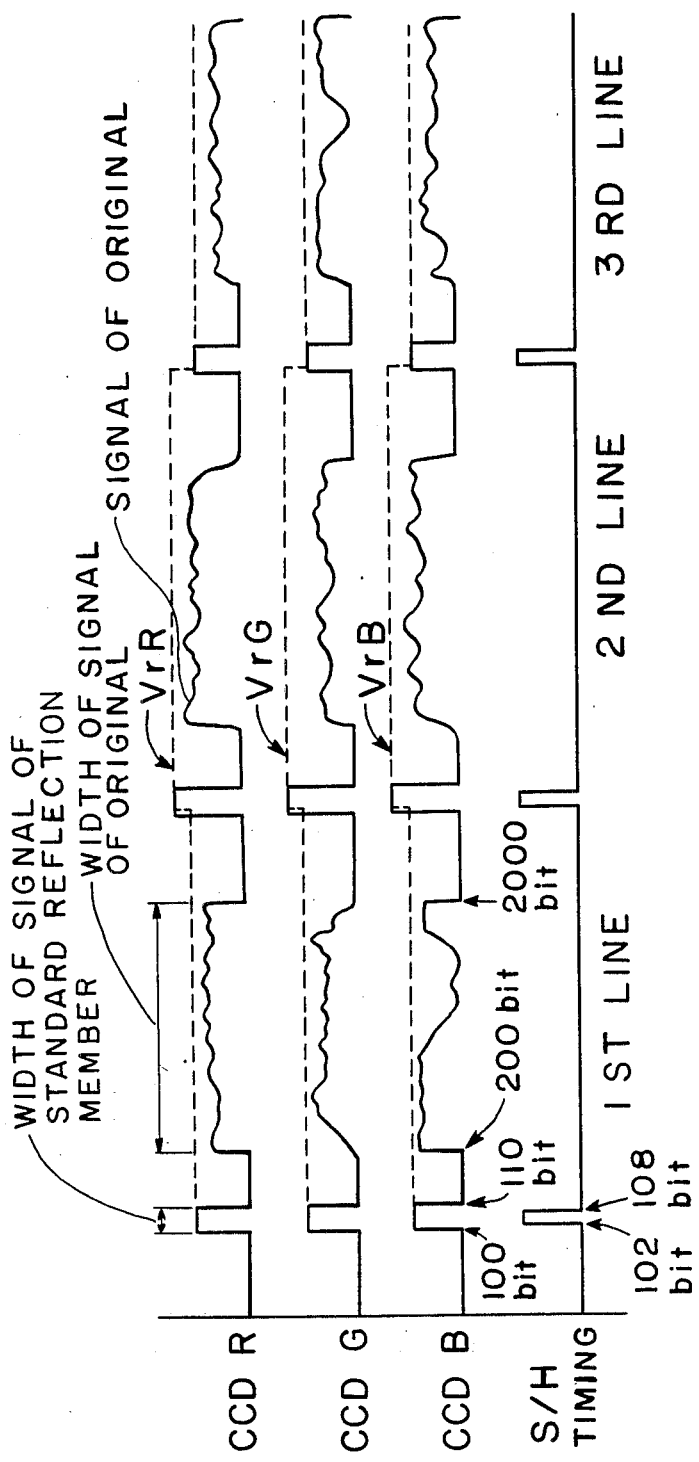
FIG. 6 is a diagram of electric signals of the separated color information obtained by scanning of the original.

Output electrical signals of each read out means 9a, 9b and 9c can be illustrated as shown in FIG. 6. In the main scanning of each line each read out means 9a, 9b and 9c or CCD R, CCD G and CCD B read out at first the light reflected from the standard reflection plate 10 and then the image of the original. Therefore the standard white background can be read out always by the light reflected from the standard reflection plate 10 independent of whether or not the line in the original includes white. And therefore the white balance can be maintained by holding the level of each separated color information of the white colored light reflected from the standard reflection plate 10 at a constant value.

Referring to FIG. 6 a pulse signal showing S/H timing is predetermined within a time range for reading out of the light from the standard reflection plate 10 (standard reflection range). For example S/H timing is selected at a range between 102th bit and 108th bit within the standard reflection range between 150th bit and 110th bit. The output of each gain controlled amplifier for red, green and blue is held at the timing shown by the S/H timing pulse. The held outputs for red, green and blue are compared with a standard input voltage $V_r$ and the differences are calculated in error amplifiers for red, green and blue and further the outputs of each color are compensated in the gained controlled amplifiers for each color into a constant level. In the drawings red is designated by R, green is designated by G and blue is designated by B.

In each A/D converter a standard constant voltage $V_{REF}$ is impressed and the inputs from the gain controlled amplifier to the A/D converter within a range between 0 and $V_{REF}$ level are converted corresponding to each input value but the inputs beyond the standard voltage $V_{REF}$ are converted corresponding to the input level $V_{REF}$. Therefore the quantized outputs of A/D converters for each colours red, green and blue can be used as image information under white balanced condition.

On a next line for example 2nd line, the 2nd S/H timing pulse signal is fed to the gain controlled amplifiers for red, green and blue and the outputs of the gain controlled amplifiers are compensated as explained hereinabove. In each line of sub scanning the outputs of the gain controlled amplifiers are compensated based on the light reflected from the standard reflection plate, so that the white balance can be automatically controlled in each line.

Standard input $V_r$ is a common voltage value for all separated colors, so that the signal levels of the white color portions can remain the same.

According to the invention the white balance can be controlled and good reproduction can be obtained.

In the embodiment shown in FIG. 3 the standard reflection plate 10 is attached on the under surface of the original supporting member 1. In this embodiment the luminous ehergy of the reflected light and the signal level are larger than that of the embodiment in which the standard reflection plate is attached on the upper surface of the original supporting member 1.

On each CCD the image on the upper surface of the original supporting member 1 is formed, so that the image forming plane of the standard reflection plate 10 is deviated from the surface of CCD. Therefore the image formed on CCD by the light reflected from the standard reflection plate 10 is out of focus and an averaged standard signal can be obtained. On the sensing plane of CCD the light reflected from a point on the standard reflection plate can not be consentrated on a point, but an area is required for the light reflected from the point. Therefore an averaged standard signal can be obtained.

Figure 7:
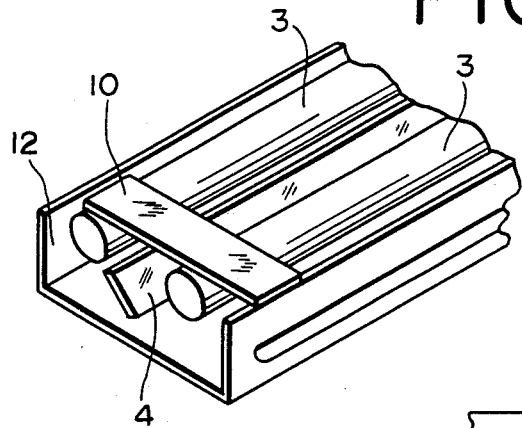
FIG. 7 is a perspective view of another embodiment of this invention.
Figure 8:
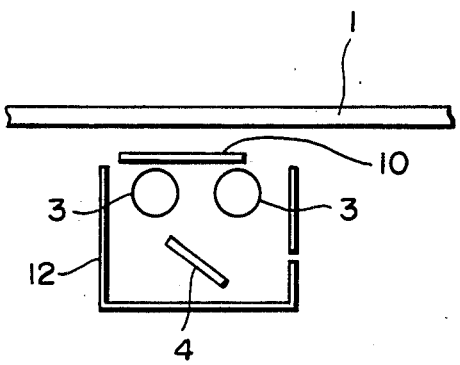
FIG. 8 is a front sectional view of FIG. 7.

FIGS. 7 and 8 show an another embodiment of this invention. 12 designates a carriage frame for supporting light sources 3 and a mirror 4. The standard reflection plate 10 is attached on the carriage frame 12. A white reflection surface of the standard reflection plate 10 faces to the light source 3 and the standard reflection plate 10 is arranged outside of the effective read out range for the original. The white reflection surface can be covered by the transparent film.

This reading device can achieve the same effect as the abovementioned embodiment and the width of the standard reflection plane 10 can be made smaller than that of the abovementioned embodiment.

Figure 9:
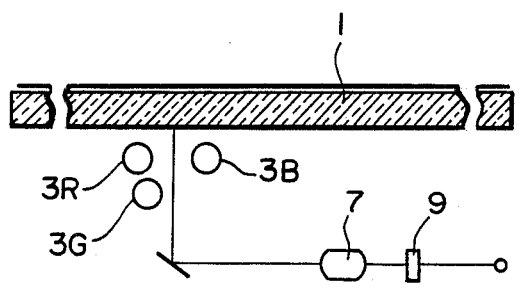
FIG. 9 is a schematic view of the optical system of another embodiment of this invention.

The invention is not limited to the embodiments shown in the drawings variations are possible. For example the optical system can be stationarily fixed and the original can be reciprocated for scanning. As shown in FIG. 9 many lamps, for example three lamps or a red lamp 3R, a green lamp 3G and a blue lamp 3B, are arranged and these lamps are turned on successively for reading out the original. In this case only one CCD and only one electrical circuit are sufficient for reading the separated color information.

Figure 10:
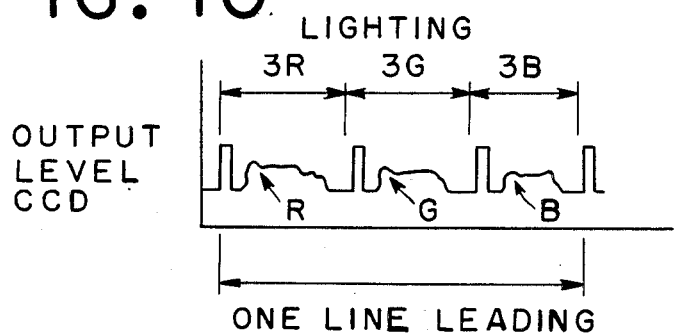
FIG. 10 is a diagram of electric signals obtained by the apparatus shown in FIG. 9.

FIG. 10 shows image information in a line scanning obtained by the reading device in FIG. 9.

Figure 11:
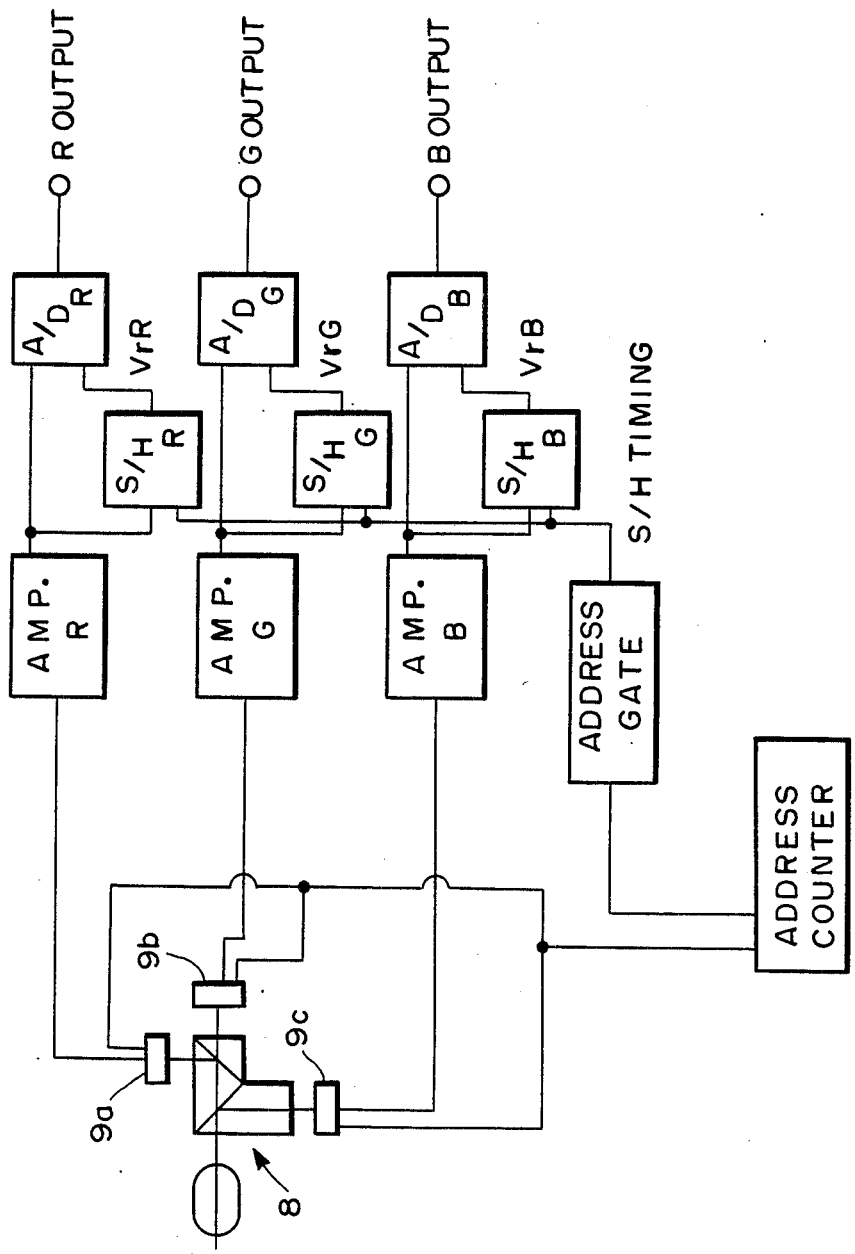
FIG. 11 is an electric circuit of another example.

FIG. 11 shows another example of the electrical circuit. In this example the error amplifier in FIG. 5 is not used, and the outputs of the amplifiers for each separated color such as red, green and blue at the S/H timing indicated by the pulse signal from the address gate are held in S/H circuits for red, green and blue. These held outputs correspond to the outputs according to the information of the white color light reflected from the standard reflection plate 10 in each line of sub scanning.

The outputs held in each S/H circuit are fed into A/D converters for each color as a standard input voltage $V_r$. The output of the S/H circuit for red $V_{rR}$ is fed to the A/D converter for red, the output of the S/H circuit for green $V_{rG}$ is fed to the A/D converter for green and the output of the S/H circuit for blue $V_{rB}$ is fed to the A/D converter for blue.

By using the standard reflection plate the white balance can be always controlled based on the information obtained from the standard reflection plate.

What is claimed is:

1. An apparatus for reading the image information of a colored original, comprising:
    a supporting member for supporting a color original at an original position;
    a standard reflection member for white balance, disposed outside the original position;
    means for scanning an original placed at said original position and said standard reflecting member in a main scanning direction and in a sub scanning direction, including an optical system having a light source for illuminating the original and the standard reflection member and a lens for forming an image of the original and of the standard reflection member by using light reflected therefrom, wherein the standard reflecting member is elongated in the sub scanning direction;
    color separating means for separating the reflected light image into at least two separated color images;
    a reading device for reading the separated color images and for converting them to respective electrical output signals; and
    control means for compensating the electrical output signals corresponding to the separated color images of the original on the basis of the electrical output signals corresponding to the separated color images of the standard reflection member.

2. An apparatus as in claim 1, wherein the standard reflection member is between the light source and the original supporting member.

3. An apparatus as in claim 2, wherein the supporting member has a surface on which the original is placed and an opposite surface, and the standard reflection member is on said opposite surface.

4. An apparatus as in claim 2, wherein the standard reflection member is secured to the light source.

5. An apparatus as in any one of claims 2 to 4, including a transparent film covering the surface of the standard reflection member facing the light source.

6. An apparatus as in claim 1, wherein the control means comprises a respective electrical circuit for each separated color image corresponding to the original, each electrical circuit including a gain controlled amplifier whose gain is controlled on the basis of the electrical output signals corresponding to the standard reflection member.

7. An apparatus as in claim 1, wherein the control means comprises a respective electrical circuit for each separated color image corresponding to the original, each electrical circuit including a respective A/D converter capable of operating with a variable reference voltage, wherein the reference voltage of each converter is controlled on the basis of the electrical output signals corresponding to the standard reflection member.

8. An apparatus as in claim 1, wherein the control means comprises a respective electrical circuit for each separated color image corresponding to the original, each electrical circuit including an attenuator in a form of a ladder-type network.

9. An apparatus comprising:
    means for supporting a color original;
    a standard reflection member for white balance, which is outside the original;
    means for scanning the original and the reflection member along scan lines which are parallel to a main scanning direction and are spaced from each other along a sub scanning direction, to form an image of the original and an image of the reflection member for each scan line;
    means for separating the images into respective color separation images in at least two colors;
    means for converting the separation images into respective electrical signals; and
    means for compensating the electrical signals for the separated images of scan lines of the original on the basis of the electrical signals for corresponding scan lines of the reflection member to achieve white balance for said scan lines.

10. Apparatus as in claim 9 in which the compensating means include a respective circuit for each separated color image of the original and each circuit includes a respective amplifier whose gain for a given scan line depends on the electrical signals for the reflection member for the same scan line.

11. Apparatus as in claim 9 in which the compensating means include a respective circuit for each separated color image of the original and each circuit includes an A/D converter capable of operating with a variable reference voltage, and means for applying to the respective converters reference voltages which for any given scan line depend on the electrical signals for the reflection member for the same scan line.

* * * * *